(12) United States Patent
Hamann et al.

(10) Patent No.: US 10,168,448 B2
(45) Date of Patent: Jan. 1, 2019

(54) MACHINE LEARNING APPROACH FOR ANALYSIS AND PREDICTION OF CLOUD PARTICLE SIZE AND SHAPE DISTRIBUTION

(71) Applicant: International Business Machines Corporation, Armonk, NY (US)

(72) Inventors: Hendrik F. Hamann, Yorktown Heights, NY (US); Siyuan Lu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 13/873,601

(22) Filed: Apr. 30, 2013

(65) Prior Publication Data
US 2014/0324350 A1 Oct. 30, 2014

(51) Int. Cl.
*G01W 1/10* (2006.01)

(52) U.S. Cl.
CPC .................................. *G01W 1/10* (2013.01)

(58) Field of Classification Search
CPC .......... G01W 1/10; G01W 1/12; G06Q 10/04; Y02E 10/563; G06F 17/5009; Y04S 10/54
USPC ............ 702/2, 3, 4, 189, 60; 703/5; 700/291
See application file for complete search history.

(56) References Cited

U.S. PATENT DOCUMENTS

| | | | |
|---|---|---|---|
| 2,702,471 A | 2/1955 | Vonnegut | |
| 4,929,079 A | 5/1990 | Delfour et al. | |
| 5,221,927 A | 6/1993 | Palmer | |
| 5,777,481 A * | 7/1998 | Vivekanandan | G01N 22/04 324/640 |
| 8,725,459 B2 * | 5/2014 | Herzig | H02J 13/0062 702/182 |
| 9,170,033 B2 * | 10/2015 | Kroyzer | F24J 2/38 |

(Continued)

FOREIGN PATENT DOCUMENTS

JP 2011159199 A 8/2011

OTHER PUBLICATIONS

Iwabuchi, Hironobu, "Efficient Monte Carlo Methods for Radiative Transfer Modeling" (p. 2324-2338 (2006)).*

(Continued)

*Primary Examiner* — Roy Y Yi
*Assistant Examiner* — Jeffrey Aiello
(74) *Attorney, Agent, or Firm* — Vazken Alexanian; Michael J. Chang, LLC (57) ABSTRACT

Techniques for analysis and prediction of cloud particle distribution and solar radiation are provided. In one aspect, a method for analyzing cloud particle characteristics includes the steps of: (a) collecting meteorological data; (b) calculating solar radiation values using a radiative transfer model based on the meteorological data and blended guess functions of a cloud particle distribution (c) optimizing the cloud particle distribution by optimizing the weight coefficients used for the blended guess functions of the cloud particle distribution based on the solar radiation values calculated in step (b) and measured solar radiation values; (d) training a machine-learning process using the meteorological data collected in step (a) and the cloud particle distribution optimized in step (c) as training samples; and (e) predicting future solar radiation values using forecasted meteorological data and the machine-learning process trained in step (d).

10 Claims, 3 Drawing Sheets

(56) References Cited

U.S. PATENT DOCUMENTS

| | | | | |
|---|---|---|---|---|
| 2007/0027664 A1* | 2/2007 | Anderson | ........... | G01N 21/3504 703/2 |
| 2011/0295575 A1* | 12/2011 | Levine | ................. | G06Q 30/02 703/2 |
| 2011/0299079 A1 | 12/2011 | Fugal | | |
| 2012/0097543 A1 | 4/2012 | Anekal | | |
| 2013/0117608 A1* | 5/2013 | Kirby | ..................... | G01W 1/10 714/32 |
| 2013/0231906 A1 | 9/2013 | Luvalle | | |
| 2016/0007426 A1* | 1/2016 | Ashdown | ........... | H05B 37/0227 700/90 |

OTHER PUBLICATIONS

J.R. Key et al., "Parameterization of shortwave ice cloud optical properties for various particle habits," Journal of Geophysical Research, vol. 107, No. D13, AAC7-1, (Jul. 2002).

A. Arakawa et al., "Interaction of a Cumulus Cloud Ensemble with the Large-Scale Environment, Part I," Journal of the Atmospheric Sciences, vol. 31, No. 3, pp. 674-701 (1974).

Y.X. Hu et al., "An Accurate Parameterization of the Radiative Properties of Water Clouds Suitable for Use in Climate Models," J. Climate, 6, 728-742 (Apr. 1993).

Y. Takano et al., "Solar Radiative Transfer in Cirrus Clouds. Part I: Single-Scattering and Optical Properties of Hexagonal Ice Crystals," Journal of the Atmospheric Sciences, vol. 46, No. 1 (Jan. 1989).

H. Iwabuchi "Efficient Monte Carlo Methods for Radiative Transfer Modeling," Journal of the Atmospheric Sciences, vol. 63, Issue 9, p. 2324-2339 (Sep. 2006).

Ou et al., "Remote Sensing of Cirrus Cloud Particle Size and Optical Depth Using Polarimetric Sensor Measurement," Journal of Atmospheric Science, vol. 62, Issue 12, 4371-4383 (Dec. 2005).

J. Zhang, "The Research of Artificial Neural Network Based on Nonparametric Regression Theory," 2010 International Conference on Internet Technology and Applications, pp. 1-4 (Aug. 20-22, 2010).

J.R. Quinlan, "Induction of Decision Trees," Machine Learning, 1:81-106 (1986).

Snoek et al., "Practical Bayesian Optimization of Machine Learning Algorithms," Conference of the Neural Information Processing Systems Foundation (Dec. 2012).

Karabatsos, "Adaptive-model Bayesian nonparametric regression," Electronic Journal of Statistics, vol. 6 2038-2068 (Dec. 2012).

J.P. Fugal et al., "Cloud particle size distributions measured with an airborne digital in-line holographic instrument," Atmospheric Measurement Techniques, vol. 2, Mar. 2009, pp. 259-271.

D.P. Donovan et al., "Cloud effective particle size and water content profile retrievals using combined lidar and radar observations 2. Comparison with IR radiometer and in situ measurements of ice clouds," Journal of Geophysical Research, vol. 106, No. D21, Nov. 2001, pp. 27,449-27,464.

P.R. Field et al., "Parameterization of ice-particle size distributions for mid-latitude stratiform cloud," Quarterly Journal of the Royal Meteorological Society, vol. 131, No. 609, Jul. 2005, pp. 1997-2017.

G. Videen et al., "Reconstruction of Aerosol Properties from Forward-scattering Intensities," Report ARL-MR-0763, Army Research Lab Adelphi MD Computational and Information Sciences Directorate, Jan. 2011.

E.J. Kennelly et al., "Physical retrieval of cloud-top properties using optimal spectral sampling," Proceedings of SPIE, vol. 5890, 589019, Sep. 2005.

* cited by examiner

MACHINE LEARNING APPROACH FOR ANALYSIS AND PREDICTION OF CLOUD PARTICLE SIZE AND SHAPE DISTRIBUTION

FIELD OF THE INVENTION

The present invention relates to meteorological analysis and more particularly, to machine learning-based techniques for analysis and prediction of cloud particle distribution and solar radiation.

BACKGROUND OF THE INVENTION

The accurate modeling of the transfer of solar radiation through a cloudy atmosphere is one of the open problems hindering accurate weather prediction and various other technologies. One such technology—the accurate forecast of available solar energy during cloudy days—is a key to viable and economic solar energy production.

The modeling of radiative transfer through a cloud is based on the physical theory of light scattering by microparticles. Input parameters for light scattering (thus in turn for radiative transfer models) are the size and shape distribution of liquid water droplets (size only) and ice particles (size and shape) in the cloud. However such key parameters are unknown in most cases and have to be empirically "guessed" in even the state-of-the-art radiative transfer models. Unfortunately, given the complexity of cloud physics, there is no reliable model for first principle prediction of cloud particle size/shape distribution. Furthermore while certain experimental methods (such as Ka-band zenith radar operating at around 35 GHz) can measure cloud particle size distribution (but cannot measure shape), they have their limitations and are often too sophisticated and costly to cover continental-wide areas.

The existing technologies for analyzing cloud size/shape distribution are essentially all based on direct measurement. This includes ground or satellite based Radar and Lidar which illuminate the cloud layer with microwave and visible/IR EM waves and detect the waves reflected by the cloud layers. The cloud particle sizes and distributions are then calculated using the reflected signal. Other methods include using aircraft to fly into clouds and collect cloud water or ice particles and then measure the characteristics of the collected particles. Similarly, optical instruments onboard aircraft may be used to directly measure cloud particle size/shape distribution. These technologies are expensive and can only be deployed, infrequently, to limited geographical locations.

Thus, improved techniques for analyzing cloud particle size and shape distribution would be desirable.

SUMMARY OF THE INVENTION

The present invention provides machine learning-based techniques for analysis and prediction of cloud particle distribution and solar radiation. In one aspect of the invention, a method for analyzing cloud particle characteristics is provided. The method includes the steps of: (a) collecting meteorological data; (b) calculating solar radiation values using a radiative transfer model based on the meteorological data and blended guess functions of a cloud particle distribution such that the solar radiation values are generated for each of the blended guess functions; (c) optimizing the cloud particle distribution by optimizing the weight coefficients used for the blended guess functions of the cloud particle distribution based on the solar radiation values calculated in step (b) and measured solar radiation values; (d) training a machine-learning process using the meteorological data collected in step (a) and the cloud particle distribution optimized in step (c) as training samples; and (e) predicting future solar radiation values using forecasted meteorological data and the machine-learning process trained in step (d).

In another aspect of the invention, a system for analyzing cloud particle characteristics is provided. The system includes (a) a databus module configured to collect meteorological data; (b) a guess function module configured to provide blended guess functions of a cloud particle distribution; (c) a radiative transfer model module configured to calculate solar radiation values using a radiative transfer model based on the meteorological data from the databus module and the blended guess functions of cloud particle distribution from the guess function module such that the solar radiation values are generated for each of the blended guess functions; (d) a radiation measurement data module configured to collect measured solar radiation values; and (e) a machine learning module configured to i) optimize the cloud particle distribution by optimizing the weight coefficients used for the blended guess functions of the cloud distribution based on the solar radiation values from the radiative transfer model module and the measured solar radiation values from the radiation measurement data module, (ii) train a machine-learning process using the meteorological data collected by the databus module and the cloud particle distribution optimized in step (i) as training samples, and (iii) predict future solar radiation values using forecasted meteorological data and the machine-learning process trained in step (ii).

A more complete understanding of the present invention, as well as further features and advantages of the present invention, will be obtained by reference to the following detailed description and drawings.

DETAILED DESCRIPTION OF PREFERRED EMBODIMENTS

Provided herein is a machine-learning based approach for analyzing and predicting cloud particle distribution (size and/or shape) leveraging upon the vast existing historical weather and solar radiation data in the public domain.

Figure 1:
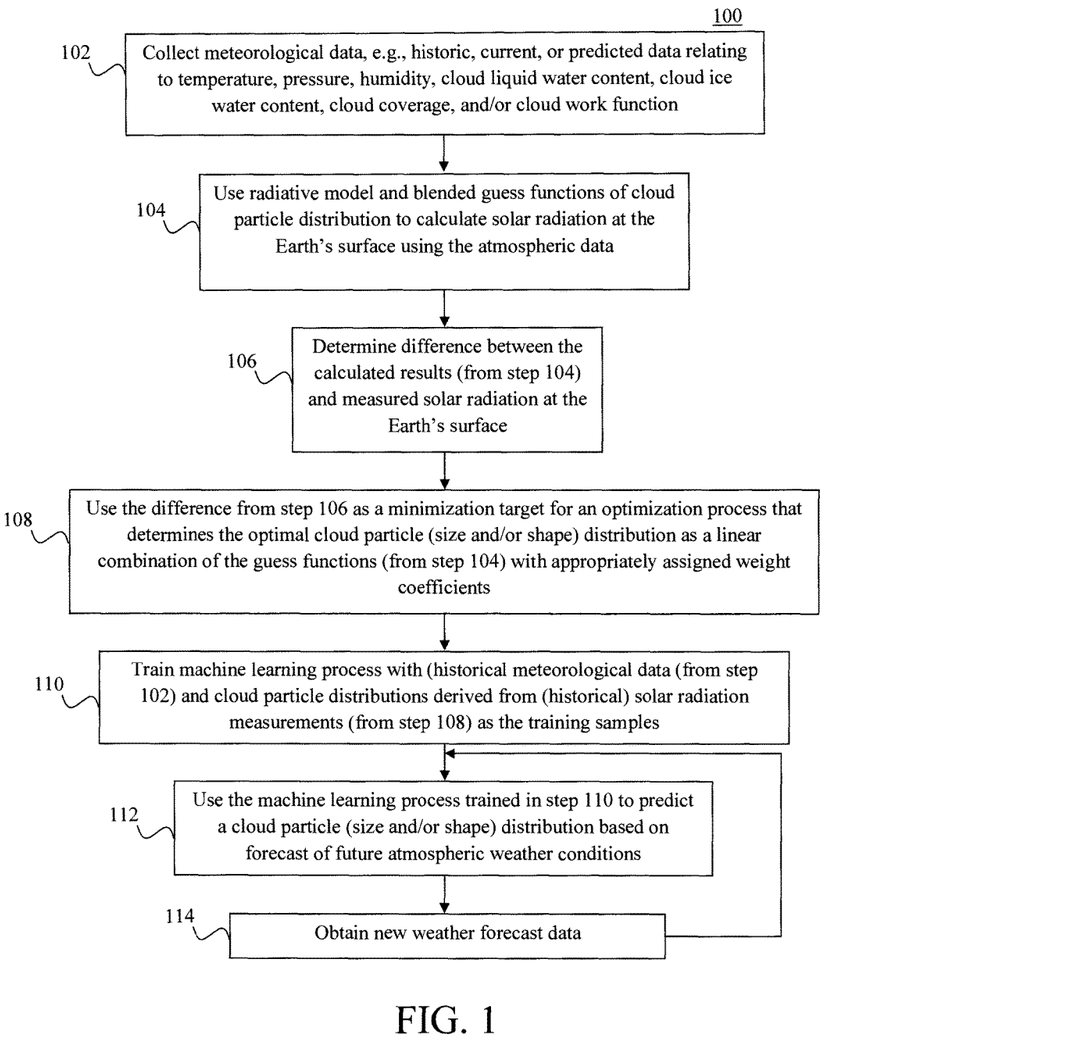
FIG. 1 is a diagram illustrating an exemplary methodology for analyzing and predicting cloud particle characteristics according to an embodiment of the present invention.

FIG. 1 is a diagram illustrating an exemplary methodology 100 for analyzing and predicting cloud particle characteristics. As described above, clouds can contain liquid water droplets and/or ice particles. These are the cloud particles analyzed in the present techniques. The term "cloud particle characteristics," as used herein refers to cloud particle size distribution and/or cloud particle shape distribution. It is notable that liquid water droplets are considered to have an amorphous shape and are approximated as a sphere. Thus analysis and prediction of shape distribution, as described herein, preferentially pertains to ice particles in the clouds which can generally have one of the following shapes: dendrite, aggregate, bullet-rosette, plate, hollow column, and solid column. See, for example, J. R. Key et al., "Parameterization of shortwave ice cloud optical properties for various particle habits," Journal of Geophysical Research, vol. 107, No. D13, AAC7-1, (July 2002), the entire contents of which are incorporated by reference herein. As will be described in detail below, the size distributions of both liquid water droplets and ice particles are analyzed herein.

In step 102, meteorological data is collected. According to an exemplary embodiment, the meteorological data includes atmospheric parameter and geographical data (i.e., so as to link the atmospheric data to a particular geographical location(s)). By way of example only, the atmospheric data includes, but is not limited to, temperature data, pressure data, humidity data of the atmosphere; aerosol optical depth (used to calculate solar light attenuation by aerosol in, e.g., desert or polluted regions), cloud liquid water content data, cloud ice water content data, cloud coverage data, and/or work function data of the cloud. Cloud work functions are the energy differences between water in the cloud and in the environment which indicates how likely cloud is to grow or diminish. The original definition of cloud work function is contained in A. Arakawa et al., "Interaction of a Cumulus Cloud Ensemble with the Large-Scale Environment, Part I," Journal of the Atmospheric Sciences, Volume 31, No. 3, pp. 674-701 (1974). The aforementioned data are available covering the continental United States with a 1-10 kilometer (km) spatial resolution and other regions of the world with similar or lower spatial resolution. Moreover these data are also available as a function of vertical height and/or averaged over the entire height of the atmosphere.

Further, the data collected in step 102 may be obtained from a number of different sources and might relate to past/historic, current, or forecast of future/predicted meteorological conditions. For instance, historical atmospheric data for a particular geographical location(s), such as temperature, pressure, humidity, cloud liquid content, cloud ice water content, cloud coverage, and/or cloud work function may be obtained from archives kept for example by National Oceanic and Atmospheric Administration (NOAA) National Climatic Data Center and NOAA National Digital Forecast Database. The NOAA also provides numerical weather prediction (NWP) model datasets predicting future weather conditions. As will be described in detail below, the historic meteorological data will be used to train the present machine learning-based prediction techniques. Future/predicted meteorological conditions may then be provided to the machine learning model thus created to predict solar radiation at the Earth's surface in the future.

Geographical data may similarly be obtained from resources such as the satellite imaging datasets maintained by the National Aeronautics and Space Administration (NASA). Examples of geographical data include latitude, longitude, elevation, and surface albedo (reflectivity of the earth's surface). As will be described in detail below, the geographical data can be used in accordance with the present techniques to provide a time-independent frame of reference for the process.

As provided above, the historical meteorological data collected in step 102 is used to train the system. An overall goal of the process is to be able to predict (future) the amount of solar radiation that will impact the Earth's surface for a given set of weather conditions. Thus, the system is trained using the historical meteorological data, a radiative transfer model(s) and guess functions of various different cloud particle size distribution and shape distribution.

The solar radiation (from the sun) that passes through the Earth's atmosphere is modified (e.g., scattered or absorbed) by the particles and gas molecules in the atmosphere. Thus, the atmospheric parameters obtained in step 102 and the size/shape distribution of the cloud particles, affects how much solar radiation reaches the Earth's surface.

Accordingly, in step 104, a radiative transfer model(s) is/are used to calculate solar radiation at the Earth's surface based on the historical meteorological data and blended guess functions of cloud particle size distribution and shape distribution. The sun can be thought of as a constant radiation source, thus the solar radiation at the top of the Earth's atmosphere (TOA) is known and essentially only dependent upon the distance between the sun and the Earth. Knowing the solar radiation at TOA, solar radiation at the Earth's surface can be calculated by accounting for the attenuation of solar radiation that penetrates through the Earth's atmosphere. The light path length in the atmosphere depends upon the solar zenith angle ($\theta_{sun}$) and is shortest at local noon. The attenuation factors are (1) aerosol (referring to aerosol other than cloud particles), (2) gaseous species (water vapor, carbon dioxide, ozone, and oxygen, and several other trace gases), and (3) clouds. The aerosol attenuation factor is important for desert or highly polluted regions. Its effect is usually presented by its optical depth (attenuation factor=exp[-sec ($\theta_{sun}$)·$\tau_{aerosol}$], where $\tau_{aerosol}$ is the total aerosol optical depth. Total aerosol optical depth for the entire atmosphere for a given location at a given time of the year is available, for example, from NASA MODIS satellite data archives. Similarly the attenuation of the solar radiation by a gaseous species is given by exp [-sec($\theta_{sun}$) ·α·m] where α is the mass extinction coefficient of the gas species, m is the mass of the gas species in a vertical column of the atmosphere which is known given a vertical profile of the atmosphere available from meteorological data archives kept by NOAA.

For a cloudy day, the radiation attenuation by clouds is usually the dominant factor. The cloud attenuation can be determined by calculating the photon scattering and absorption by cloud particles. Assuming a photon hits a cloud particle of a given size and shape (which are the two input parameters) as well as the known complex refractive index of liquid water and ice, the theory of electromagnetism can be applied to calculate the probability of the photon being scattered into a particular angle (between 0° and 180° with respect to the incoming photon) as well as the probability of the photon being absorbed (not exiting the cloud particle). The angular distribution of scattering probability is referred to herein as a scattering phase function. The ratio of scattering probability to the sum of scattering and absorption probability is referred to as single scattering albedo. Knowing the size and shape of a particle, the phase function and single scattering albedo can be calculated using Mie theory (for spherical particles) or discrete dipole approximation (for non-spherical particles), the results of which are often approximated via simpler functional forms and parameterization. See, for example, Y. X. Hu et al., "An Accurate Parameterization of the Radiative Properties of Water Clouds Suitable for Use in Climate Models," J. Climate, 6, 728-742 (April 1993) and Y. Takano et al., "Solar Radiative Transfer in Cirrus Clouds. Part I: Single-Scattering and Optical Properties of Hexagonal Ice Crystals," Journal of the Atmospheric Sciences, vol. 46, no. 1 (January 1989), the entire contents of each of which are incorporated by reference herein.

The attenuation by clouds is then calculated by summing up photon scattering and absorption on individual cloud particles of a distribution of size and shape. One way to do so is via Monte Carlo simulation in which one simulates an ensemble of photons reaching the top of atmosphere and then tracks the trajectory of each individual photon as it is being scattered or absorbed by cloud particles to determine the probability of a photon reaching Earth's surface (versus being scattered upwards into space or being absorbed by the cloud particles). Note that for Monte Carlo simulation the density of the particles can be calculated from the particle size/shape distribution and the mass of liquid water and ice cloud particles per volume (i.e., cloud liquid water content and cloud ice content). The cloud liquid water content and ice cloud content is known from meteorological data even though the cloud particle size/shape is not provided. Finally, the surface albedo (reflection) of the Earth's surface can introduce a small correction to the downward solar radiation reaching Earth's surface because a photon may be reflected upwards by the Earth's surface and scattered downwards again by the clouds. The totality of the aforementioned solar radiation scattering and absorption by aerosol, gaseous species, and/or clouds as well as reflection by the earth's surface are calculated by radiative transfer models. According to an exemplary embodiment, the radiative transfer model is a Monte Carlo aerosol radiative transfer model. Monte Carlo aerosol radiative transfer models are described, for example, in H. Iwabuchi "Efficient Monte Carlo Methods for Radiative Transfer Modeling," Journal of the Atmospheric Sciences, Vol. 63, Issue 9, p. 2324-2339 (September 2006) (hereinafter "Iwabuchi"), the entire contents of which are incorporated by reference herein. Iwabuchi presents variance reduction techniques for the Monte Carlo radiative transfer model, such as unbiased modification of local estimates for radiance calculations to reduce the computational burden required for sampling many small contributions from each scattering event.

Guess functions are a convenient way to implement different cloud particle distributions to obtain various possible outcomes given the atmospheric parameter data at hand. Basically, the guess functions permit one to take a certain given dataset (such as that obtained in step 102) and apply that data to a number of different possible cloud particle distribution scenarios. The result will be models adapted to the various cloud particle distribution scenarios tested by the guess functions. Guess functions are described in the context of cloud particle size and optical depth, for example, in Ou et al., "Remote Sensing of Cirrus Cloud Particle Size and Optical Depth Using Polarimetric Sensor Measurement," Journal of Atmospheric Science, volume 62, Issue 12, 4371-4383 (December 2005) (hereinafter "Ou"), the contents of which are incorporated by reference herein. According to Ou, an initial guess is made for particle size and optical depth followed by a linear interpolation scheme to determine parameters for the cloud ice crystal size, optical depth, etc. Potential functional forms of the guess functions suitable for cloud particle size distribution include normal distribution function, log-normal distribution function, Poisson distribution function, or rectangular function, etc. As provided above, multiple outputs of the radiative transfer model will be generated from step 104 assuming different blends of several guess functions of cloud particle distributions. Blend refers to a weighted combination of guess functions. In the simplest form, the blend can be a weighted linear combination of guess functions (i.e., a sum of guess functions multiplied by weight coefficients). More complex forms of blending include but are not limited to the following procedure (1) subject the guess functions to a nonlinear operation (e.g., square of the guess functions), (2) sum up each operated guess function multiplied by its weight coefficient, and (3) apply the inverse operation (e.g., square root) to obtain the blend. Basically, one begins with a few guess functions that collectively cover the cloud particle size range of interest (on the order of 1 micrometer ($\mu$m) to 100 $\mu$m). An example of choice can be a set of normal distribution functions centered at 2 $\mu$m, 4 $\mu$m, 8 $\mu$m, 16 $\mu$m, 32 $\mu$m, and 64 $\mu$m. One then linearly combines the guess functions with weight coefficients (referred to as blending). The blending allows one to generate in theory an infinite number of cloud particle distributions for radiative transfer calculation, which is preferable to using individual guess functions. This way a large number of different size distributions can be sampled by varying a few weight coefficients. Solar radiation values are generated using the radiation transfer model for each of the blends of guess functions employed. An optimal blending can then be selected (i.e., a set of weight coefficients is selected) given the criteria that the calculated solar radiations (total, direct and diffusive irradiances in different spectral windows) using the blending are closest to the measured values.

According to an exemplary embodiment, the calculation and measurement of Earth surface solar radiation is resolved spectrally. Namely, the calculation of the radiation that transfers through a cloud is dependent on the wavelength of the incident solar light. With the blended guess functions of size and shape distributions of the cloud particles as well as the density of the particles (derived by dividing liquid water and ice content in the cloud (which is available from weather models) by the averaged mass of cloud particles), the radiative transfer model can calculate the light power density reaching the Earth's surface (irradiance) integrated over any given wavelength interval. For the purpose of comparison to existing ground radiation observation for machine-learning, two wavelength intervals are most relevant because they are the intervals for which large amounts of historical radiation measurement data are generally available. The first is the shortwave region from 0.1 $\mu$m to 2 $\mu$m. The second is the long wavelength region from 5 $\mu$m to 25 $\mu$m. Irradiance for other wavelength intervals will also be calculated when applicable to radiation measurement. For example the Atmospheric Radiation Measurement (ARM) Climate Research Facility of the U.S. Department of Energy (DOE) measures solar irradiance at various narrow (10 nanometers (nm) wide) wavelength intervals centered at 415 nm, 500 nm, 615 nm, 673 nm, 870 nm, and 940 nm. The comparison of calculated and measured irradiances at different wavelength intervals (instead of using only shortwave and longwave wavelength intervals) greatly enhances the data availability and will improve the effectiveness of machine learning.

These solar radiance calculations (from step 104) are then validated using a machine learning-based technique against measured solar radiation values and correlated to meteorological conditions. See description of steps 106 to 110, below. Note that the validation is performed for large datasets that involve many geographical locations (see below) and time (wherever and whenever solar radiation measurement is available) thus covering various meteorological conditions.

Specifically, in step 106, the difference between the calculated solar radiation results (using the radiative transfer model from step 104) and measured solar radiation at the Earth's surface is determined. Solar radiation at the Earth's surface can be measured using conventional instrumentation, such as a pyranometer which is a sensor that measures total solar irradiance on a planar surface, a pyrheliometer which is a sensor that measures direct solar irradiance (solar light reaching the sensor without being scattered by clouds, etc.), or a pyranometer with sun blocker which measures diffusive solar irradiance (sensitive only to scattered solar light). Earth surface solar radiation datasets are available, for example, from a network of surface radiation (SURFRAD) stations provided by the National Oceanic & Atmospheric Administration (NOAA), Earth System Research Laboratory, Global Monitoring Division, or from the Atmospheric Radiation Measurement (ARM) Climate Research Facility of the U.S. Department of Energy (DOE). In addition to these scientific facilities, a large number of solar power plants are also equipped with solar radiation measurement facilities and are able to provide solar radiation data. Satellite imagery insolation products such as those from the NOAA's geostationary operational environmental satellites provide yet another source of solar radiation measurements that cover a large geographical area. The calculation of solar radiation will be performed for locations where historical measurements are available.

In step 108, the difference between the calculated solar radiation and the measured solar radiation is then used as a minimization target for an optimization process that determines the optimal cloud particle (size and/or shape) distribution(s) as a blend(s) of the guess functions from step 104 (e.g., linear combination of the guess functions with appropriately assigned weight coefficients). By way of example only, an exemplary optimization methodology 200 for guess function blending using weight coefficients is provided in FIG. 2.

Figure 2:
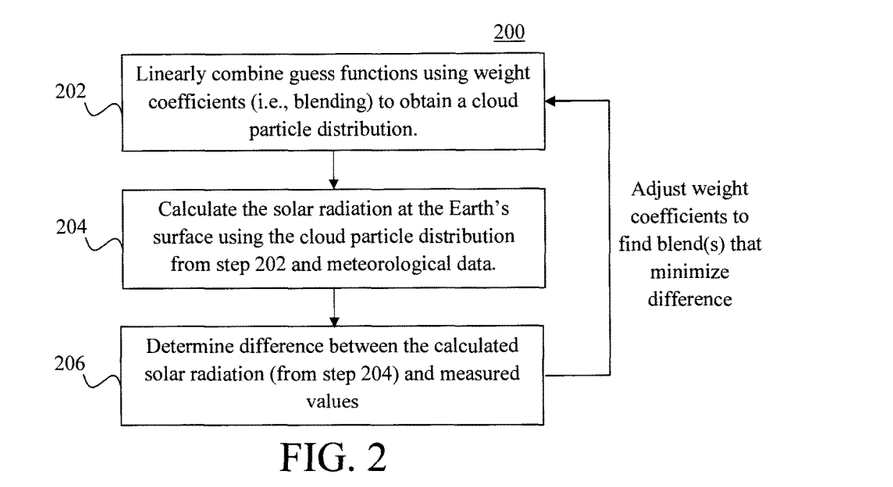
FIG. 2 is a diagram illustrating an exemplary optimization methodology for guess function blending using weight coefficients according to an embodiment of the present invention.

As provided above, the process begins with a set of basis guess functions. An example of choice of guess functions can be a set of normal distribution functions of sizes of center 2 μm, width 2 μm; center 4 μm, width 4 μm; center 8 μm, width 8 μm, center 16 μm, width 16 μm; center 32 μm, width 32 μm; and center 64 μm, width 64 μm. The initial approximate values of weight coefficients for each of the above normal distribution functions can be chosen according to the cloud size distribution hypothesized by Deirmendjian in D. Deirmendjian, "Electromagnetic Scattering on Spherical Polydispersions," Elsevier, New York (NY) (April 1969), the entire contents of which are incorporated by reference herein. The value of Deirmendjian distribution at 2 μm is used as the weight coefficient for the normal distribution centered at 2 μm, same for other sizes. Other choices of initial guess functions include, but are not limited to, log-normal distribution, Poisson distribution, rectangular function. In step 202, the guess functions are combined linearly using the weight coefficients (referred to herein as "blending") to obtain a cloud particle distribution. In step 204, the solar radiation at the Earth's surface is calculated using the cloud particle distribution from step 202 and the meteorological data (see above). In step 206, the difference between the calculated solar radiation (from step 204) and measured values is determined. This process was described in detail above.

The steps 202-206 are then repeated after adjusting the weight coefficients used for blending the guess functions. This iterative process allows one to search the parameter space of the weight coefficients to find the blend(s) that minimize the difference in calculated vs. measured solar radiation values. Optimization methods such as gradient methods and simulated annealing may be applied for this purpose.

Referring back to FIG. 1, in step 110, the historical meteorological data collected in step 102 is correlated with the optimal blend(s) of cloud particle (size and/or shape) distribution from step 108 (obtained, e.g., using methodology 200 of FIG. 2). In one exemplary embodiment, this correlation between historical meteorological data and cloud particle (size and/or shape) distribution is performed using machine learning-based methods.

Machine learning involves making predictions based on characteristics learned from data. In this case, the set of training/validation examples for machine learning includes the meteorological data (e.g., temperature, pressure, humidity, cloud liquid content, cloud ice water content, cloud coverage, and cloud work function—see above) as the features and the optimal blend(s) of cloud particle distribution (i.e., the set of weight coefficients for the guess functions) as the labels. Note that the training example involves a large set of meteorological conditions and cloud particle distributions obtained at many locations over a long historic time period. The machine learning process is used to classify the meteorological conditions into subsets and determining in each subset which cloud particle distribution is likely to occur. Thus, here the meteorological data is the input and the optimal blending of cloud particle distribution obtained from step 108 is the output. Machine learning is applied to the training samples and acquires the capability of predicting the output when given an input. For a general description of machine learning see, for example, M. Mohri et al., "Foundations of Machine Learning (Adaptive Computation and Machine Learning series," MIT Press, Cambridge, Mass. 2012, the entire contents of which are incorporated by reference herein)

Suitable machine learning processes include, but are not limited to, simple linear regression approaches, or advanced processes such as neural network or regression tree-based nonparametric regression methods, or Bayesian parameter optimization methods. Neural network-based nonparametric regression is described, for example, in J. Zhang, "The Research of Artificial Neural Network Based on Nonparametric Regression Theory," 2010 International Conference on Internet Technology and Applications, pgs. 1-4 (20-22 Aug. 2010), the entire contents of which are incorporated by reference herein. Regression tree-based nonparametric regression techniques are described, for example, in J. R. Quinlan, "Induction of Decision Trees," Machine Learning, 1:81-106 (1986), the contents of which are incorporated by reference herein. Bayesian parameter optimization is described, for example, in Snoek et al., "Practical Bayesian Optimization of Machine Learning Algorithms," Conference of the Neural Information Processing Systems Foundation (December 2012), the contents of which are incorporated by reference herein.

In step 112 of methodology 100 the machine learning process is then used to predict a cloud particle (size and/or shape) distribution on forecast of future atmospheric weather conditions. As described above, this predicted meteorological data can be obtained from sources such as from the NOAA numerical weather prediction model datasets in step 102. Specifically, the machine learning process can now be used to select the optimal cloud size/shape distribution presented by a blend of the guess functions (e.g., blend most likely for each subset of meteorological conditions—see above). Such a blend of cloud particle distribution guess function is used in the radiative transfer model to predict radiation at the Earth's surface. Further, as new weather forecast data becomes available, it can be provided into the machine learning process in an iterative manner—see step 114 of methodology 100.

Figure 3:
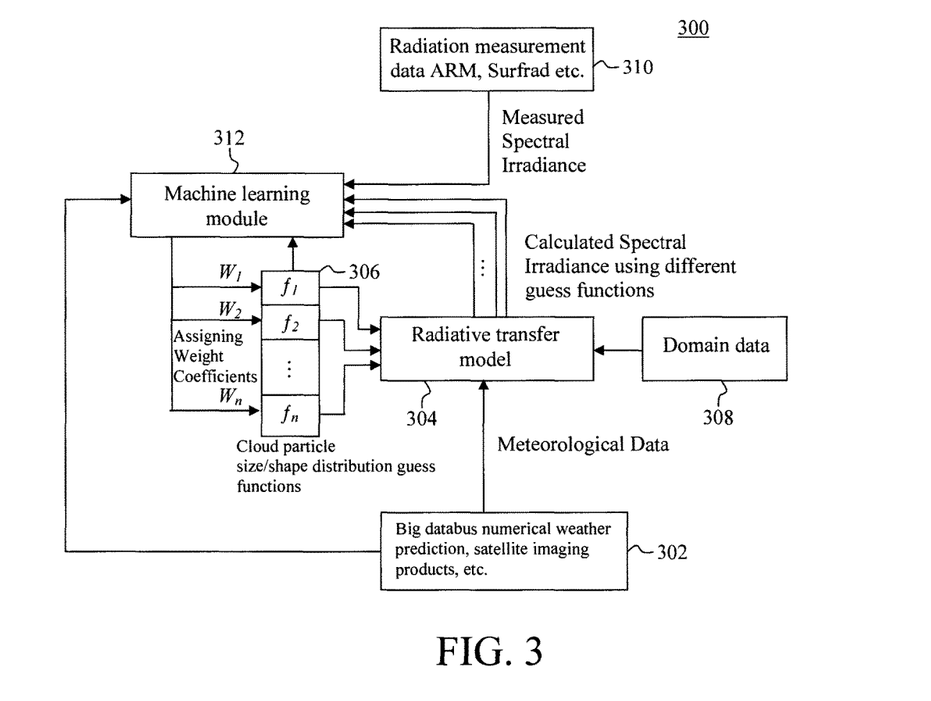
FIG. 3 is a diagram illustrating an exemplary system for analyzing and predicting cloud particle characteristics according to an embodiment of the present invention.

FIG. 3 is a diagram illustrating an exemplary system 300 for analyzing and predicting cloud particle characteristics. As described in detail below, system 300 may be configured to perform the steps of methodologies 100 (FIG. 1) and 200 (FIG. 2) and may be embodied in an apparatus, such as apparatus 400 described in conjunction with the description of FIG. 4, below. As shown in FIG. 3, system 300 includes a databus module 302, a radiative transfer model module 304, a guess function module 306, a domain data module 308, a radiation measurement data module 310, and a machine learning module 312.

As described in conjunction with the description of step 102 of FIG. 1, above, meteorological data such as atmospheric parameter and geographical data—e.g., temperature data, pressure data, humidity data, cloud liquid content data, cloud ice water content data, cloud coverage data, and/or cloud work function data—is obtained from a number of different sources and might relate to past/historic, current, or forecast of future/predicted meteorological conditions. The big databus module 302 in system 300 serves to gather such meteorological data inputs from various numerical weather prediction models and satellite imaging datasets such as those from NOAA and NASA (see above). Similarly, as per step 114 of FIG. 1, new weather forecast data, when available, is fed into the system to permit future solar radiation predictions. This updated forecast data may likewise be provided via databus module 302.

The databus provides the meteorological data to radiative transfer modeling module 304 in system 300 using discrete ordinate solver, Monte Carlo or other methods (see above). As described above, in contrast to the solar radiative transfer models currently being used in conventional processes which calculate cloud light scattering using hypothetical cloud particle distributions, various blends of guess functions (provided by guess function module 306) of cloud particle (size and/or shape) distributions will be used in the present system as inputs for the radiative transfer model module 304 (which is configured to calculate radiation at the Earth's surface using a radiative transfer model and the blend of guess functions provided by the guess function module 306). See description of step 104 of methodology 100 (FIG. 1) above.

Additionally, local domain data (e.g., longitude, latitude, elevation of the location, surface albedo, etc.—see above e.g., from satellite imaging datasets from NASA) provided by domain data module 308) containing time-independent geographical information will also be fed into the radiative transfer model module 304 which then computes the predicted shortwave, longwave and/or spectrally-resolved (see above) solar irradiance at the Earth's surface for the geographic locations and time where earth surface solar radiation measurement data are available as described in conjunction with the description of step 104 of methodology 100 (FIG. 1), above. For example, the NOAA SURFRAD/ISIS networks involve 14 locations in the continental U.S. and have accumulated historical data dating back to 1995. As described above, multiple outputs are generated assuming different blends of guess functions of cloud particle distribution. As described in conjunction with the description of steps 106 and 108 of methodology 100 (FIG. 1) above, these predictions of solar radiance will then be validated in the machine learning module 312 against measured solar irradiation (collected by the radiation measurement data module 310), such as those from the DOE ARM project and the NOAA Surfrad/ISIS project, and the optimal blend of cloud particle distribution will be determined.

The meteorological data from the databus module 302 are fed into the machine learning module 312 trained using historical data as discussed above so that the weather conditions are classified into subsets and, in each subset, the optimal blend of cloud particle distribution that is likely to occur is determined. The weather categorization will be performed using a set of judiciously chosen weather parameters (e.g., temperature, pressure, humidity, cloud liquid content, cloud ice water content, cloud coverage, and cloud work function). The knowledge of machine-learning optimized cloud particle distribution under a categorized subset of weather parameter space thus provides prediction power. Knowing future weather parameters from various weather prediction models, the appropriate cloud particle distribution can then be chosen by the machine learning module 312 for accurate radiative transfer modeling for various applications, such as solar power forecasting.

Figure 4:
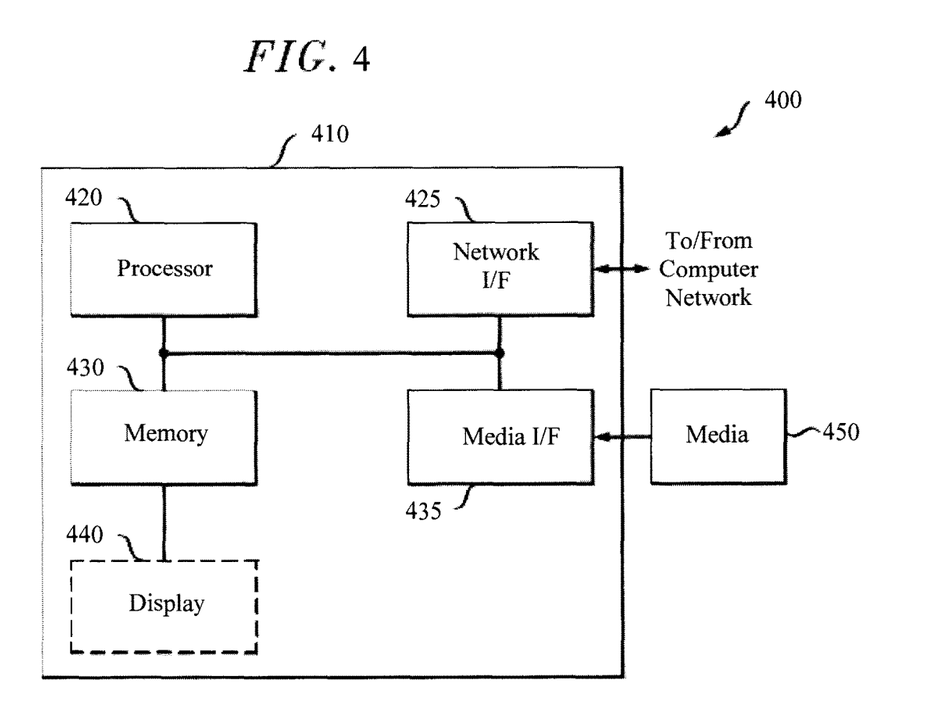
FIG. 4 is a diagram illustrating an exemplary apparatus for performing one or more of the methodologies presented herein according to an embodiment of the present invention.

Turning now to FIG. 4, a block diagram is shown of an apparatus 400 for implementing one or more of the methodologies presented herein. By way of example only, apparatus 400 can be configured to implement one or more of the steps of methodology 100 of FIG. 1 for analyzing and predicting cloud particle characteristics. As provided above, system 300 may be embodied in an apparatus, such as apparatus 400.

Apparatus 400 includes a computer system 410 and removable media 450. Computer system 410 includes a processor device 420, a network interface 425, a memory 430, a media interface 435 and an optional display 440. Network interface 425 allows computer system 410 to connect to a network, while media interface 435 allows computer system 410 to interact with media, such as a hard drive or removable media 450.

As is known in the art, the methods and apparatus discussed herein may be distributed as an article of manufacture that itself includes a machine-readable medium containing one or more programs which when executed implement embodiments of the present invention. For instance, when apparatus 400 is configured to implement one or more of the steps of methodology 100 the machine-readable medium may contain a program configured to (a) collect meteorological data; (b) calculate solar radiation values using a radiative transfer model based on the meteorological data and blended guess functions of cloud particle distribution such that the solar radiation values are generated for each of the blended guess functions; (c) optimize the blended guess functions by optimizing the weight coefficients used for blending the guess functions based on the solar radiation values calculated in step (b) and measured solar radiation values; (d) training of a machine-learning process using historical atmospheric data from (a) and the optimized cloud particle distribution derived from historical solar radiation measurement in step (c) as the training samples; and (e) using forecasted meteorological conditions and the machine learning process trained in step (d) to select one or more of optimized cloud particle distributions to predict future solar radiation values.

The machine-readable medium may be a recordable medium (e.g., floppy disks, hard drive, optical disks such as removable media 450, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 420 can be configured to implement the methods, steps, and functions disclosed herein. The memory 430 could be distributed or local and the processor device 420 could be distributed or singular. The memory 430 could be implemented as an electrical, magnetic or optical memory, or any combination of these or other types of storage devices. Moreover, the term "memory" should be construed broadly enough to encompass any information able to be read from, or written to, an address in the addressable space accessed by processor device 420. With this definition, information on a network, accessible through network interface 425, is still within memory 430 because the processor device 420 can retrieve the information from the network. It should be noted that each distributed processor that makes up processor device 420 generally contains its own addressable memory space. It should also be noted that some or all of computer system 410 can be incorporated into an application-specific or general-use integrated circuit.

Optional display 440 is any type of display suitable for interacting with a human user of apparatus 400. Generally, display 440 is a computer monitor or other similar display.

In conclusion, the present techniques advantageously leverage the vast existing and freely available historical atmospheric data and solar radiation measurement data (over 50 terabytes a day). In a coarse comparison to the Radar or Lidar methods mentioned above, the sun provides a natural light source illuminating clouds and the solar radiation measured at the Earth's surface is the detected signal which can be used to extract information on the cloud particle size/distribution through physics model based deep analytics as described above. Indeed such analytics are possible now with the latest development in IT: big data processing capability and machine learning technology. In this fashion, the cloud particle size/distribution can be derived for a much broader geographical area and time range (without deployment of additional instrumentation) which enables better prediction.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for analyzing cloud particle characteristics, the method comprising the steps of:
    (a) collecting meteorological information, wherein the meteorological information comprises both atmospheric information and geographical local domain information linking the atmospheric information to at least one geographical location, and wherein the local domain information is selected from the group consisting of: latitude, longitude, elevation and surface albedo;
    (b) calculating solar radiation values using a radiative transfer model based on the meteorological information and blended guess functions of a cloud particle distribution such that the solar radiation values are generated for each of the blended guess functions, wherein the blended guess functions describe different possible distributions of cloud particles ranging in size from 1 micrometer to 100 micrometers in order to obtain various solar radiation values given the metrological information and the different possible distributions of cloud particles described by the blended guess functions, wherein the calculating further comprises finding a blend of guess functions for subsets of meteorological conditions;
    (c) optimizing the cloud particle distribution by optimizing weight coefficients used for the blended guess functions of the cloud particle distribution based on the solar radiation values calculated in step (b) and measured solar radiation values;
    (d) training a machine-learning process using the meteorological information collected in step (a) and the cloud particle distribution optimized in step (c) as training samples, whereby the machine-learning process selects the blend of guess functions for each of the subsets of meteorological conditions; and
    (e) using the machine-learning process trained in step (d) with weather forecast information, the geographical local domain information and the cloud particle distribution optimized in step (c) to forecast solar radiation values specific to the at least one geographical location and, as new weather forecast information becomes available, providing the new weather forecast information to the machine-learning process to, in an iterative manner, obtain updated forecasts of future available solar irradiation for solar energy production at the at least one geographical location whereby the machine-learning process selects the blend of guess functions for the subsets of meteorological conditions from the updated forecasts of future available solar irradiation to forecast solar power availability for the at least one geographical location.

2. The method of claim 1, wherein the blended guess functions are linearly combined sums of guess functions multiplied by weight coefficients.

3. The method of claim 1, wherein the meteorological information comprises one or more of temperature data, pressure data, humidity data, cloud liquid content data, cloud ice water content data, cloud coverage data, and cloud work function.

4. The method of claim 1, wherein the radiative transfer model comprises a Monte Carlo aerosol radiative transfer model.

5. The method of claim 1, wherein the calculation of the solar radiation is resolved spectrally at a spectral range of 0.1 micrometers to 2 micrometers.

6. The method of claim 1, wherein the calculation of the solar radiation is resolved spectrally at a spectral range of 5 micrometers to 25 micrometers.

7. The method of claim 1, further comprising the steps of:
    (e) determining a difference between the solar radiation values calculated in step (b) and the measured solar radiation values; and
    (f) using the difference as a minimization target for optimizing the blended guess functions.

8. The method of claim 1, further comprising the step of: assigning the weight coefficients to the guess functions.

9. The method of claim 1, wherein the machine learning process comprises a simple linear regression process, a neural network-based nonparametric regression process, a regression tree-based nonparametric regression process, or a Bayesian parameter optimization process.

10. The method of claim 1, wherein the blended guess functions have a functional form selected from the group consisting of: normal distribution function, log-normal distribution function, Poisson distribution function, and rectangular function.

* * * * *